United States Patent Office 3,781,332
Patented Dec. 25, 1973

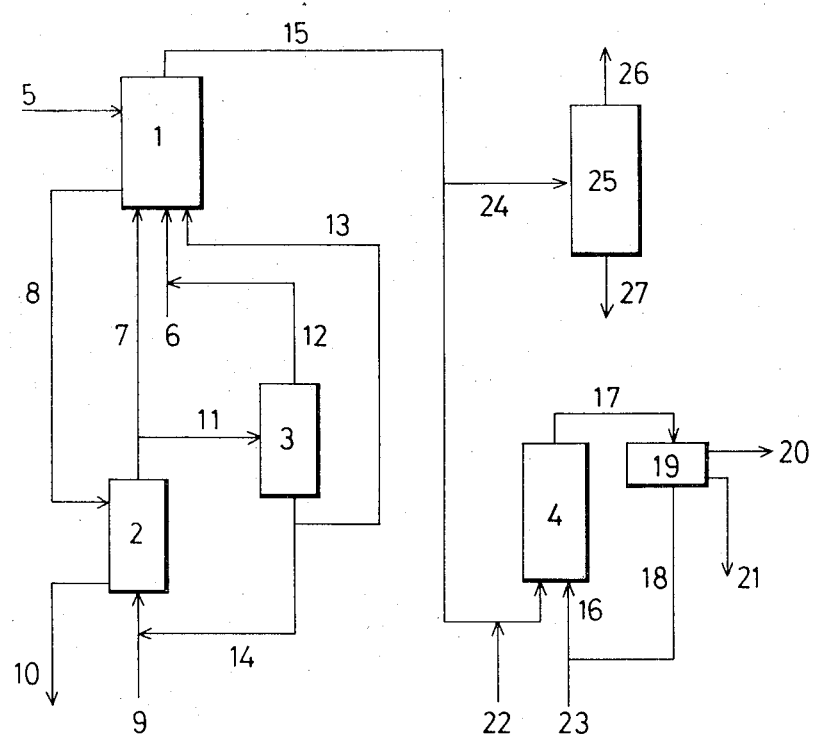

3,781,332
PROCESS FOR THE EXTRACTION OF METHACRYLIC ACID FROM AQUEOUS SOLUTIONS
Ryozi Sato, Takaoka, and Yasuyoshi Chino, Tokyo, Japan, assignors to Nippon Zeon Co., Ltd.
Filed Dec. 23, 1971, Ser. No. 211,416
Claims priority, application Japan, Dec. 28, 1970, 45/119,626
Int. Cl. C07c 69/54
U.S. Cl. 260—486 R 14 Claims

ABSTRACT OF THE DISCLOSURE

A process for separating methacrylic acid from an aqueous solution by use of an extraction solvent composed of methyl or ethyl methacrylate and not more than 50% of xylene, ethyl benzene or a mixture thereof.

---

This invention relates to a process for extracting methacrylic acid from a methacrylic acid-containing aqueous solution. More particularly, the invention pertains to process in which methacrylic acid is extracted with a specific solvent from a methacrylic acid-containing aqueous solution and then separated in the form of a methacrylic acid ester.

Methacrylic acid is prepared by the hydrolysis of methacrylonitrile or by the catalytic vapor phase oxidation of isobutylene or methacrolein. In this case, however, the methacrylic acid is ordinarily obtained as an aqueous solution containing the same. For example, in case methacrylic acid is desired to be obtained according to the catalytic vapor phase oxidation, the reaction is ordinarily effected in the presence of a large amount of steam. Accordingly, when recovered by cooling and condensation, methacrylic acid is obtained, in most cases, as a methacrylic acid-containing aqueous solution having a concentration of not more than 50% by weight.

The step for separation and recovery of methacrylic acid from a dilute methacrylic acid-containing aqueous solution having such a low concentration as, for example, up to 50% by weight is an extremely important step since methacrylic acid is ordinarily an intermediary material for the production of methacrylic acid esters. However, not only is methacrylic acid higher in boiling point than water but also such carboxylic acids, ketones and aldehydes as acrylic acid, formic acid, formaldehyde, acrolein, acetone, methylethylketone, etc., which are by-products of the methacrylic acid-formation reaction and which migrate also into said aqueous solution, have a complex azeotropic relation with methacrylic acid. In order to solve the above-mentioned problem, many separation processes have heretofore been proposed, but it is impossible to say that said processes are satisfactory from the industrial and economical standpoint.

For example, if an ordinary distillation process is adopted, a large amount of water is required to be removed to bring about undesirable increase of equipment costs and operational expenses. Moreover, methacrylic acid is a typical unsaturated fatty acid, and hence easily brings about a polymerization reaction when exposed to high temperatures in the distillation operaton, with the result that the operation cannot proceed smoothly and the recovered methacrylic acid is degraded in quality and lowered in yield.

An azeotropic dehydration process using benzene, toluene or a chlorinated hydrocarbon as an entrainer cannot be said to be an advantageous process because a large amount of water must be removed.

An extraction process using an ether, aromatic hydrocarbon, ketone or ester is greatly dominated by the kind of the extraction solvent. For example, if an aromatic hydrocarbon is used as the extraction solvent, the extraction efficiency of methacrylic acid is not satisfactory, and if an ester, ketone or ether is used, the mutual solubility of acid and water increases, through the extraction efficiency is satisfactory, to bring about drawbacks, such as migration of water and dissolution loss of solvent, or the stability of operation is adversely affected due to the density difference, interfacial tension and the like, of the extraction system.

As the result of extensive studies on processes for extracting methacrylic acid from methacrylic acid-containing aqueous solutions, we found that the use of a methacrylic acid ester is extremely effective for the extraction; and that when said ester is used in combination with a small amount of xylene, ethylbenzene or a mixture thereof, the physical properties of the extraction system are improved and the extraction operation can effectively be carried out, and, when the extract is subjected to an esterification step as mentioned later, the methacrylic acid can be separated and recovered as a methacrylic acid ester. On the basis of the above finding, we have accomplished the present invention. The process of the present invention is effectively applicable for extracting methacrylic acid from a dilute aqueous methacrylic acid-containing solution having a concentration as low as 5% by weight.

Orginally, methacrylic acid is ordinarily used in the form of an ester, so that if methacrylic acid is not required to be isolated from the extract, not only the steps before formation of methacrylic acid ester can be shortened but also the system can be treated in a more stable form. That is, an ester of a fatty acid is lower in boiling point than the fatty acids, so that if the acid is brought into the form of ester, the conditions for separation and purification of the acid can be made milder and the loss of the acid due to polymerization can be made small to bring about such marked additional advantages that the amount of polymerization inhibitor used may be made smaller and troubles encountered in the operation can be decreased.

An object of the present invention is to provide a process for extracting methacrylic acid from a methacrylic acid-containing aqueous solution by use of an extraction solvent composed of (i) methyl or ethyl ester of methacrylic acid (hereinafter referred to, in some cases, as "Solvent A") and (ii) xylene or ethylenbenzene or a mixture thereof (hereinafter referred to, in some cases, as "Solvent B"), with the amount of said Solvent B being not more than 50% by weight of the extraction solvent.

Another object of the invention is to provide a process according to the above-mentioned process, wherein the Solvent A, which has been dissolved in the extraction residue aqueous phase, is extracted with Solvent B, and (a) a part or all of the thus obtained extract (Solvent A-Solvent B) and/or (b) a part or all of a distillate and/or a distillation residue formed by distilling a part or all of said extract are recycled to the methacrylic acid extraction step.

A further object of the invention is to provide a process according to the above-mentioned process, wherein the weight ratio of Solvent A:Solvent B in the extract containing the methacrylic acid is adjusted to 1:1 to 1:8, the methacrylic acid in the extract is esterified with an alcohol in the presence of an esterification catalyst; and then the resulting methacrylic acid ester is isolated from the extract.

The methacrylic acid ester (Solvent A), which is one component of the extraction solvent used in the present invention, has such advantages that it is excellent in methacrylic acid-extracting ability and can sufficiently display the extracting ability even when the methacrylic acid concentration of the aqueous solution is lowered. Moreover the extraction efficiency does not decrease at a lower methacrylic acid concentration, unlike the case of a hydrocarbon type solvent. For example, in the case of a solution of 0.5 g. of methacrylic acid in 1 kg. of water, the concentration of methacrylic acid in a methyl ester of methacrylic acid is 3.0 g./kg. ester, in the equilibrium state. On the other hand, in case the extraction solvent is heptane, the concentration is about 0.05 g./kg. heptane, and in case the solvent is toluene, the concentration is about 0.1 g./kg. toluene, under the same condition as above. When such a hydrocarbon type extraction solvent is used, and when the amount of methacrylic acid contained in the aqueous solution is lowered, the concentration of methacrylic acid present in the aqueous phase becomes higher than that of the acid in the extraction solvent. Accordingly, the amount of solvent necessary for extraction of methacrylic acid can be greatly decreased when methacrylic acid ester is used as the solvent. For example, in order to recover 99% of methacrylic acid from a 20% aqueous methacrylic acid solution by 5- to 10-stage countercurrent extraction, it is sufficient to use methacrylic acid ester in an amount of 0.2 to 0.5 times the amount of said aqueous methacrylic acid solution. In case a hydrocarbon type extraction solvent is used, it is ordinary that the amount of the solvent required becomes more than the amount of the aqueous methacrylic acid solution. In addition, methacrylic acid ester has such advantage that it is high in selectivity for methacrylic acid, and the acetic acid and similar impurities present are minimally extracted.

Although the distribution coefficient data obtained by laboratory test show that methacrylic acid ester has a high extraction ability, it causes various troubles in the dynamic state of actual operation. For example, when the extraction operation is carried out by using only methacrylic acid ester as the extraction solvent, the extraction phase system tends to become so unstable due to the density difference, intersurface tension and the like of the said system as to make it unsuitable for actual operation, whereby the extraction efficiency is greatly decreased. Further, in the above case, the allowable flow rate of the extracting solvent necessary for the extraction operation becomes lower, so that a large scale apparatus is required in order to maintain the given amount of treatment per hour of a methacrylic acid-containing aqueous solution, as in the case of the hydrocarbon type solvents. Also it takes a longer time to separate the obtained extract into an organic phase and aqueous phase. Accordingly, the use of only methacrylic acid ester as the extraction solvent is quite disadvantageous and even makes the extraction operation impossible, in extreme cases.

With an aim to overcome the above-mentioned disadvantages, we made ardent studies to find that a solvent comprising methyl or ethyl methacrylate (Solvent A) and xylene or ethylbenzene or a mixture thereof (Solvent B), with the amount of Solvent B being not more than 50% by weight of the extraction solvent, is markedly excellent as the extraction solvent. Moreover, the Solvent A-Solvent B system containing methacrylic acid is preferable also as a material to be fed to the methacrylic acid-esterification step. Further, the use of such extraction solvent is quite advantageous in that Solvent B is usable as a solvent for extracting Solvent A in the methacrylic acid extraction residue aqueous phase obtained from the methacrylic acid extraction step, and that the resulting extract (Solvent A-Solvent B) can be used as it is as a part of the extraction solvent in the methacrylic acid extraction step. Thus, the extraction solvent according to the present invention is effectively utilizable.

The amount of the extraction solvent to be used in the present invention is not more than 10 times, preferably 0.1 to 3 times, the weight of the aqueous methacrylic acid solution. The amount of Solvent B in the extraction solvent is 5 to 50% by weight. If the amount of Solvent B in the extraction solvent is larger than 50% by weight, the extraction efficiency is lowered, while if the amount of said solvent is smaller than 5% by weight, there are brought about such operational inconveniences that the system is deteriorated in stability and the extraction efficiency is lowered. Further, the amount of Solvent B is preferably less than 15 times the weight of methacrylic acid in the methacrylic acid-containing aqueous solution, though the said amount may suitably be varied depending on the amount of methacrylic acid in the methacrylic acid-containing aqueous solution, the amount of said solution to be treated, the treatment conditions, etc.

The extraction operation is effected at a temperature within the range from 0° to 70° C., ordinarily at room temperature. The apparatus to be used may be any of those for continuous or batch-wise operation, and is suitably selected according to the mode of practice from the perforated plate type, rotary disc type, packed column type, mixer-settler type, etc.

The isolation and recovery of methacrylic acid from the extraction phase is effected by distillation or the like operation.

As the xylene, o-, m- or p-xylene or a mixture thereof may be used. The use of a xylene fraction is also preferable.

According to the above-mentioned methacrylic acid extraction operation, methacrylic acid is obtained as the extraction phase from a methacrylic acid-containing aqueous solution. On the other hand, however, the amount of methacrylic acid ester (Solvent A) based on the amount of water becomes 1 to 2% by weight (e.g. 1.59% in the case of methyl methacrylate at 20° C.), and thus the amount of methacrylic acid ester dissolved in the extraction residue aqueous phase becomes non-negligible. In order to avoid this, there is provided a step of treating said phase by an extraction operation, using xylene, ethylbenzene or a mixture thereof (Solvent B) as the extraction solvent. This is because the distribution coefficient of methyl methacrylate in a xylene-water system becomes more than 20, even when the methyl methacrylate concentration of the water phase is so low as 0.1 g./kg. water, and thus indicates that the recovery thereof by extraction with Solvent B is quite easy.

In the above case, Solvent A in the extraction residue aqueous phase formed by the extraction of methacrylic acid is extracted with Solvent B to obtain an extraction phase. A part or all of said extraction phase (a) composed of Solvent A and Solvent B and/or a part or all of a distillate (Solvent A) or a distillation residue (Solvent B) (b) which are obtained by distilling a part or all of said extraction phase are skillfully utilized as part of the solvent for the methacrylic acid extraction solvent. As a result methacrylic acid ester, which forms a somewhat unstable extraction phase despite its being excellent in methacrylic acid-extracting ability, can be improved into an extraction solvent capable of forming a stable extraction phase without being substantially deteriorated in extraction efficiency. One of the characteristics of the present invention resides in the above-mentioned point.

For the recovery of Solvent A which has been dissolved in the extraction residue aqueous phase, it is preferable to use Solvent B in an amount of 0.1 to 0.5 times the weight of the aqueous solution to be treated. The extraction operation is effected at a temperature within the range from 0° to 70° C., ordinarily at room temperature. The apparatus to be used may be any of those for continuous or batch-wise operation, and is suitably selected from the perforated plate type, rotary disc type, packed column type, mixer-settler type etc.

Generally, the conversion in a reaction for synthesizing an ester from an acid and an alcohol is dominated by the equilibrium

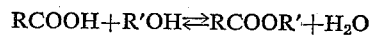

(wherein R and R' are individually an alkyl group). In a closed reaction system, therefore, the conversion to ester is restricted by the equilibrium constant of the aforesaid equilibrium. In order to increase the conversion and reaction rate of such an equilibrium reaction as the aforesaid ester synthesis, there have heretofore been proposed processes in which the alcohol is used in excess of the acid; the reaction product is taken out of the closed system by distillation during the reaction; or the reaction is effected at a relatively high temperature. These processes, however, are not satisfactory since the alcohol is required to be used in large quantities, a polymerization reaction takes place as a side-reaction, and various inconveniences are encountered in the operation.

According to the present process, however, the methacrylic acid-containing extract obtained as the extraction phase from the methacrylic acid extraction step can be used as it is as a starting material for esterification, whereby the methacrylic acid can be separated and recovered in the form of methacrylic acid ester.

That is, Solvent B is added to the extraction phase obtained from the methacrylic acid extraction step, so that the amount of Solvent B becomes 0.5 to 10 times, preferably 1.0 to 8 times, the weight of the methacrylic acid ester (Solvent A) present in said extraction phase, and then the resulting mixture is subjected to esterification step. If the amount of Solvent B is smaller, the yield of ester is undesirably lowered, while if the amount thereof is large, the apparatus should be made greater in size, and various utilities (power, heat source, etc.) are necessarily increased to bring about disadvantages.

The esterification reaction is carried out in the presence of an alcohol and an esterification catalyst at a temperature in the range from 60° to 150° C., preferably from 70° to 130° C. The esterification of the methacrylic acid contained in the organic solvent (Solvent A+Solvent B) which has been extracted in the above-mentioned manner is effected by contacting the acid with an acid catalyst and an alcohol at an elevated temperature, while forming two phases of an aqueous phase and an organic phase, so that the formed ester and water are transferred into organic and aqueous phases, respectively, and the shift of equilibrium can sufficiently be effected, whereby the ester can be obtained in a high yield. Moreover, the amount of alcohol necessary for the reaction may be made smaller than in the conventional process, with the result that the amount of alcohol migrated into the organic phase is also decreased to make it possible to simplify the operation in the subsequent separation step.

The solution formed after the esterification reaction comprises an organic phase composed mainly of the methacrylic acid ester formed by the esterification reaction, Solvent A and Solvent B, and an aqueous phase containing the alcohol and, in some cases, the esterification acid catalyst and the water formed by the esterification. The two phases of said solution are separated from each other. The organic phase is subjected to distillation, for example, without any complex step, whereby the ester can be recovered. A part or all of the Solvent B separated from the ester may be returned to the esterification step, or a part of said solvent may be recycled to the methacrylic acid esterification step. In case the methacrylic acid ester formed by the above-mentioned esterification reaction is a methyl or ethyl ester, the said ester may be used as Solvent A, whereby the aforesaid distillation operation can be simplified. From the above, it would be understood that the present invention has such advantage that the methacrylic acid ester obtained can be used as it is as Solvent A to be used in the present process. On the other hand, the aqueous phase may be recycled to the system so as to supplement to the system the alcohol and acid catalyst contained therein and to withdraw the water formed in the esterification.

The alcohol used in the esterification reaction is an alcohol having a cyclic or acyclic hydrocarbon group having 1 to 18 carbon atoms. Examples of the alcohol include monovalent alkyl alcohols having 1 to 18 carbon atoms, such as methyl alcohol, ethyl alcohol, butyl alcohol, octyl alcohol and stearyl alcohol.

In each of the above-mentioned operations, it is desirable to adopt such a measure that a suitable amount of a polymerization inhibitor such as hydroquinone, hydroquinone monomethyl ether or phenothiazine is used to prevent the methacrylic acid or methacrylic acid ester from a useless polymerization reaction. Further, in the extraction operation, the addition of a suitable inorganic salt to the aqueous phase is also preferable for the increase of extraction efficiency.

As mentioned above, the present invention provides a process in which a solvent comprising the methacrylic acid ester (Solvent A), which is quite effective for methacrylic acid extraction, is skillfully utilized in combination with water-insoluble xylene, ethylbenzene or a mixture thereof (Solvent B), which is quite effective for the recovery of methacrylic acid ester (Solvent A), the stabilization of the extraction phase, the efficiency of esterification reaction, and the subsequent separation of the resulting methacrylic acid ester. The individual steps are skillfully combined with each other, so that the steps are simplified with or without isolating the methacrylic acid to recover, with industrial and economical advantages, the methacrylic acid in the form of methacrylic acid ester.

An embodiment of the present invention is explained below with reference to the accompanying drawing.

A methacrylic acid-containing aqueous solution is fed through a pipe 5 to an extractor 1. At the lower part of the extractor 1, methacrylic acid methyl ester, which is a main component of the extraction solvent used in the present invention, is introduced through a pipe 6 into the extractor. In this case, a part or all of a solution recovered through a pipe 7 from an extractor 2 which is composed of methacrylic acid methyl ester and xylene, ethylbenzene or a mixture thereof is added so that the extraction solvent in the extractor 1 forms a desired mixture. To the extractor 2 is fed through a pipe 8 a residue from the extractor 1 which contains a small amount of methyl methacrylate, and the methyl methacrylate is recovered by means of xylene, ethylbenzene or a mixture thereof which is an extraction solvent fed through a pipe 9 to the extractor 2. Depending on the operational conditions of the extractor 2, however, a part or all of the extract is sent through a pipe 11 to a distillator 3, and the methacrylic acid methyl ester is recovered from the top and the xylene and/or ethylbenzene are recovered from the bottom. A part or all of the thus recovered compounds are sent through pipes 12 and 13 to the bottom of the extractor 1 and are used as components of the extraction solvent of the extractor 1 so as to form a mixture of desired composition and amount together with the methacrylic acid methyl ester fed through the pipe 6. The distillate from the extractor 3 may be recycled through a pipe 14 to be used as the extraction solvent of the extractor 2.

From the top of the extractor 1, a mixture (extraction phase) of methyl methacrylate, methacrylic acid and xylene or ethylbenzene or both is obtained. In order to separate the methacrylic acid from said mixture, the mixture is sent through a pipe 24 to a distillator 25 and distilled at normal pressure or under reduced pressure, whereby the methacrylic acid can be obtained from the bottom 27 of the distillator. The top distillate 26 is composed of methacrylic acid ester and xylene, ethylbenzene or a mixture thereof and contains a small amount of methacrylic acid. If necessary, therefore, the distillate is recycled as the extraction solvent of the extractor 1 or is used as a liquid for use in the subsequent esterification.

In case the methacrylic acid is desired to be recovered in the form of methacrylic acid ester, the methacrylic acid-containing top distillate (extraction phase) of the extractor 1 is sent through a pipe 15 to a reactor for the subsequent esterification. On the way, xylene or ethylbenzene is added through a pipe 22 to adjust the extraction phase to a composition preferable for esterification reactor. Further, a mixture comprising a small amount of water, sulfuric acid as an esterification acid catalyst and methanol is prepared, sent to the reactor 4 while maintaining such conditions that two phases of aqueous and organic phases are formed in the reactor, and subjected to esterification reaction at a definite temperature. From the top of the reactor 4, the mixture which has completed the reaction is taken out, sent to a suitable separator 19 and then separated into an aqueous phase and an organic phase.

The organic phase is sent through a pipe 20 to, for example, a distillator for the subsequent separation to recover the ester, while the aqueous phase is again fed through a pipe 18 to the reactor 4. In this case, water formed due to the esterification reaction can be removed out of the system, and there is adopted such a procedure that water corresponding to the formed water is withdrawn through a pipe 21, and methanol and sulfuric acid which are partly removed out of the system together with said water are supplemented through a pipe 23 to continue the reaction.

The present invention is illustrated in further detail below with reference to examples, in which the percent is by weight unless otherwise specified.

EXAMPLE 1

An aqueous solution containing 9.3% of methacrylic acid, 1.0% of acetic acid and 500 p.p.m. of hydroquinone was fed through the top to a packed column type extractor of 3.5 m. in length and 3.0 m. in glass Raschig ring-packed portion at a rate of 763 g./hr. per 100 cm.$^2$ of the cross-sectional area of the extractor to form a continuous phase. On the other hand, methyl methacrylate containing 16.6% of xylene and 500 p.p.m. of hydroquinone was fed as a dispersed phase through the bottom at a rate of 182 g./100 cm.$^2$/hr. In the above manner, the extraction of methacrylic acid was effected at room temperature to obtain 243 g./100 cm.$^2$/hr. of an extract.

The concentration of methacrylic acid in the extract was 28.3%, and the amount of methacrylic acid left in the extraction residue aqueous phase was about 1,000 p.p.m., and the extraction ratio of methacrylic acid (the ratio of recovered acid to fed acid) was 97%. Further, the acetic acid remained substantially quantitatively in the extraction residue aqueous phase, and was detected in a trace amount in the extraction phase.

100 parts by weight of the extraction phase was rectified in a distillator (packed column) which was assumed to have a number of theoretical plates of about 30. The reflux ratio was about 1.5 and the inner pressure of the system was about 420 mm. Hg (absolute pressure), and the solvent was distilled off at a column top distillation temperature of 100° to 110° C. The temperature of the residue at the bottom of the distillator showed finally 120° to 125° C. The amounts of the distillate and residue obtained were 72 parts and 26 parts by weight, respectively, and the methacrylic acid content of the former was 1.7% and that of the latter was 97.9%.

In order to recover the methyl methacrylate dissolved in the extraction residue phase, 10 parts by weight of xylene per 100 parts by weight of said phase was added, and batch-wise extraction was effected 2 times, whereby the methyl methacrylate in the aqueous phase was detected in a trace amount. The resulting xylene extraction phase was combined with the initial methacrylic acid extraction solvent.

EXAMPLE 2

An aqueous solution containing 16.1% of methacrylic acid and 0.05% of hydroquinone was fed through near the top to an extractor of 3.6 m. in packed portion at a rate of 791 g./hr. per 100 cm.$^2$ of the cross-sectional area of the extractor. On the other hand, methyl methacrylate containing 25.0% of xylene, including the xylene extraction phase of the subsequent step, and 0.05% of hydroquinone was fed through the bottom at a rate of 204 g./hr. In the above manner, an extract containing 38.3% of methacrylic acid was obtained at a rate of 327 g./hr. The extraction ratio of methacrylic acid was about 98%, and the amount of methacrylic acid left in the extraction residue phase (aqueous phase) was about 2,000 p.p.m. Subsequently, 10 parts by weight of xylene was added to 100 parts by weight of the extraction residue phase, and extraction was effected 2 times. The resulting xylene extraction phase was combined with the initial methacrylic acid extraction solvent. On the other hand, xylene was added to the methacrylic acid-containing extract to prepare an esterification material composed of 16.8% of methyl methacrylate, 14.7% of methacrylic acid, 67.5% of xylene and the balance of water (methyl methacrylate:xylene= 1:4 by weight ratio).

The reactor used for the esterification was a column type reactor having a volume of about 3.5 times the volume of flow per hour of the feed material which had been packed with glass Raschig rings and jacketed with a heat-insulating material. From the bottom of this reactor, 100 parts by weight of the aforesaid starting solution incorporated with 0.05% of hydroquinone, 7 parts by weight of an aqueous sulfuric acid solution having a concentration of about 37% and 12 parts by weight of methanol were fed in parallel to each other, and the reaction temperature was maintained at 80° to 90° C. At the time when it was considered that the system had reached a stationary state, the organic phase formed was taken out of the reactor, and methyl methacrylate in the organic phase was analyzed to find that the amount of the methyl methacrylate was more than 93 moles per 100 moles of the fed methacrylic acid. This methyl methacrylate was subjected to distillation to obtain methyl methacrylate having a purity of 98%.

EXAMPLE 3

In order to separate methacrylic acid from the same aqueous methacrylic acid solution as in Example 1, countercurrent extraction was effected, using 30.1 parts by weight per 100 parts by weight of said solution of ethyl methacrylate containing 44.5% of ethylbenzene, to obtain 38.9 parts by weight of an extract containing 22.8% of methacrylic acid. The extraction ratio of methacrylic acid was about 95%. Since the extraction residue phase contained about 0.4% of ethyl methacrylate, said phase was sufficiently shaken together with 0.3 times the weight thereof of ethylbenzene, whereby the amount of the ethyl methacrylate in the aqueous phase decreased to a trace amount.

COMPARATIVE EXAMPLE 1

The same methacrylic acid extraction as in Example 1 was effected, except that the methyl methacrylate contained no xylene. As the result, a part of the dispersed phase stayed over a long period of time and, after a while, turbidity became vigorous to bring about an oil-in-water type emulsification phenomenon, with the result that the extraction system became unstable. Further, the allowable flow rate of the extraction solvent for the extraction operation was lower in the case of the methyl methacrylate than in the case of the xylene-containing methyl methacrylate, and when the flow amount of extraction solvent was made larger in the case where the methyl methacrylate was used alone, there were brought about such operational drawbacks that the whole extraction system became unstable to cause a flooding phenomenon and the like, even when the said flow amount was within the preferable flow amount range of the xylene-containing methyl methacrylate.

COMPARATIVE EXAMPLE 2

Example 2 was repeated, except that no xylene was added to the methacrylic acid-containing extract and this extract was used as it was as the esterification material (methyl methacrylate:xylene=1:0.35 by weight ratio), whereby the amount of the resulting ester decreased to 47.9 moles per 100 moles of the fed methacrylic acid.

What we claim is:

1. A process for separating methacrylic acid by solvent extraction from a methacrylic acid-containing aqueous solution which comprises extracting methacrylic acid from said solution by use of an extraction solvent composed of methacrylic acid methyl or ethyl ester (Solvent A) and xylene, ethylbenzene or a mixture thereof (Solvent B), the amount of said Solvent B being not more than 50% by weight based on the weight of the extraction solvent.

2. A process according to claim 1, wherein the methacrylic acid-containing aqueous solution is obtained by the catalytic vapor phase oxidation of isobutylene or methacrolein in the presence of steam, and then condensing the resulting high temperature gas.

3. A process according to claim 1, wherein the methacrylic acid is isolated from the resulting extraction phase.

4. A process according to claim 1, which further comprises (i) extracting with Solvent B, the Solvent A dissolved in the resulting extraction residue aqueous phase, and (ii) recycling to the methacrylic acid extraction step, (a) a part or all of the resulting extraction phase, (b) a part or all of a distillate, or a part or all of a distillation residue which are obtained by distilling a part or all of said extraction phase.

5. A process according to claim 1, which further comprises (i) adjusting to 1:1 to 1:8 the weight ratio of Solvent A:Solvent B in the resulting extraction phase containing methacrylic acid; (ii) esterifying the methacrylic acid in the organic solution obtained in the step (i) with an alcohol in the presence of an esterification catalyst while separating the ester-containing organic liquid produced from the aqueous liquid; and (iii) isolating the ester from the organic liquid.

6. A process according to claim 5, wherein the Solvent A is methacrylic acid methyl ester, and the alcohol is methyl alcohol.

7. A process according to claim 5, wherein the Solvent A is methacrylic acid ethyl ester and the alcohol is ethyl alcohol.

8. A process according to claim 5, wherein the alcohol is an alcohol containing a cyclic or acyclic hydrocarbon group having 1 to 18 carbon atoms.

9. A process for separating methacrylic acid by solvent extraction from a methylacrylic acid-containing aqueous solution which comprises (i) extracting methacrylic acid from said solution by use of an extraction solvent composed of methacrylic acid methyl or ethyl ester (Solvent A), and xylene, ethylbenzene or a mixture thereof (Solvent B), the amount of said Solvent B being not more than 50% by weight based on the weight of the extraction solvent; (ii) extracting with Solvent B, the Solvent A dissolved in the resulting extraction residue aqueous phase; (iii) recycling to the methacrylic acid extraction step (i), (a) a part or all of the resulting extraction phase, or (b) a part or all of a distillate or a distillation residue which are obtained by distilling a part or all of said extraction phase; (iv) and then isolating the methacrylic acid from the resulting extraction phase obtained in step (i).

10. A process for separating methacrylic acid in the form of methacrylic acid ester from a methacrylic acid-containing aqueous solution which comprises (i) extracting methacrylic acid from said solution by use of an extraction solvent composed of methacrylic acid methyl or ethyl ester (Solvent A) and xylene or ethylbenzene or a mixture thereof (Solvent B), the amount of said Solvent B being not more than 50% by weight based on the weight of the extraction solvent; (ii) extracting with Solvent B the Solvent A dissolved in the resulting extraction residue aqueous phase; (iii) recycling to the methacrylic acid extraction step (i), (a) a part or all of the resulting extraction phase or (b) a part or all of a distillate, or a distillation residue which are obtained by distilling a part or all of said extraction phase; (iv) adjusting to 1:1 to 1:8 the weight ratio of Solvent A: Solvent B in the extraction phase containing methacrylic acid obtained in the step (i); (v) esterifying the methacrylic acid in the organic solution obtained the step (iv) with an alcohol in the presence of an esterification catalyst while separating an ester-containing organic liquid produced from the aqueous liquid; and (vi) then isolating the methacrylic acid ester from the organic liquid.

11. A process according to claim 9, wherein the methacrylic acid-containing aqueous solution is obtained by the catalytic vapor phase oxidation of isobutylene or methacrolein in the presence of steam, and then condensing the resulting high temperature gas.

12. A process according to claim 10, wherein the Solvent A is methacrylic acid methyl ester, and the alcohol is methyl alcohol.

13. A process according to claim 10, wherein the Solvent A is methacrylic acid ethyl ester, and the alcohol is ethyl alcohol.

14. A process according to claim 10, wherein the alcohol is an alcohol containing a cyclic or acyclic hydrocarbon group having 1 to 18 carbon atoms.

References Cited

UNITED STATES PATENTS 3,553,261    1/1971    Sennewald et al. __ 260—526 N

FOREIGN PATENTS 851,342    10/1960    Great Britain _____ 260—486

LORRAINE A. WEINBERGER, Primary Examiner

P. J. KILLOS, Assistant Examiner

U.S. Cl. X.R.

260—526 N